Jan. 17, 1939. E. J. SUDDARTH 2,144,468
CLEANSER AND STERILIZER FOR MILK AND CREAM CONTAINERS
Filed Dec. 20, 1935 2 Sheets-Sheet 1
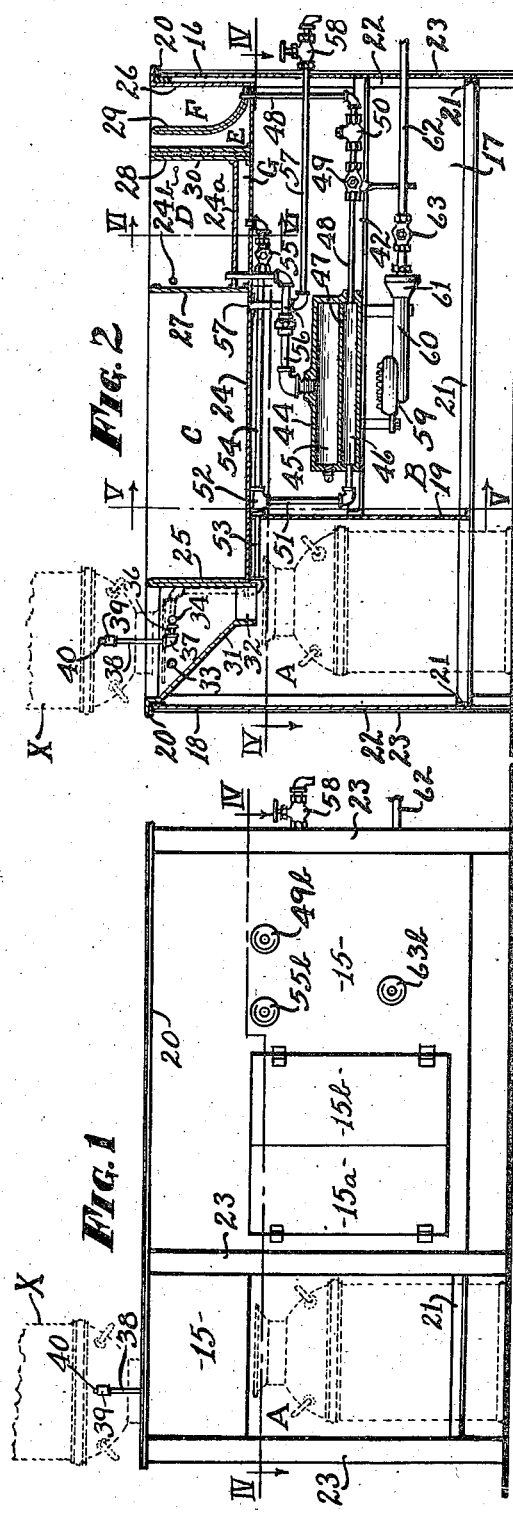
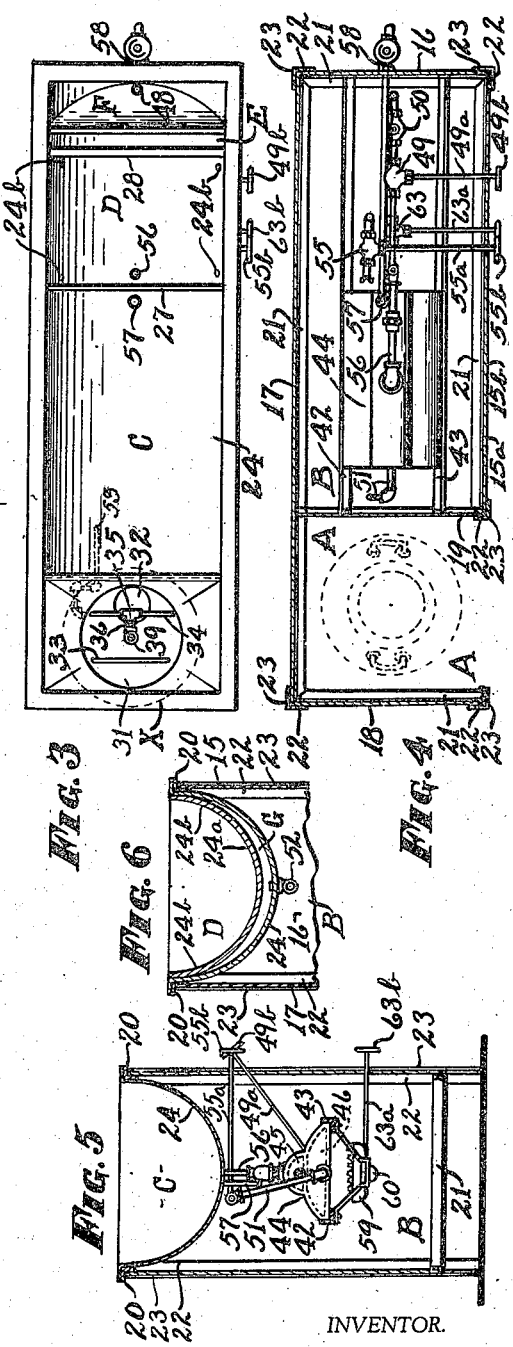
INVENTOR.
Edward J. Suddarth
BY
M. Y. Charles
ATTORNEY.

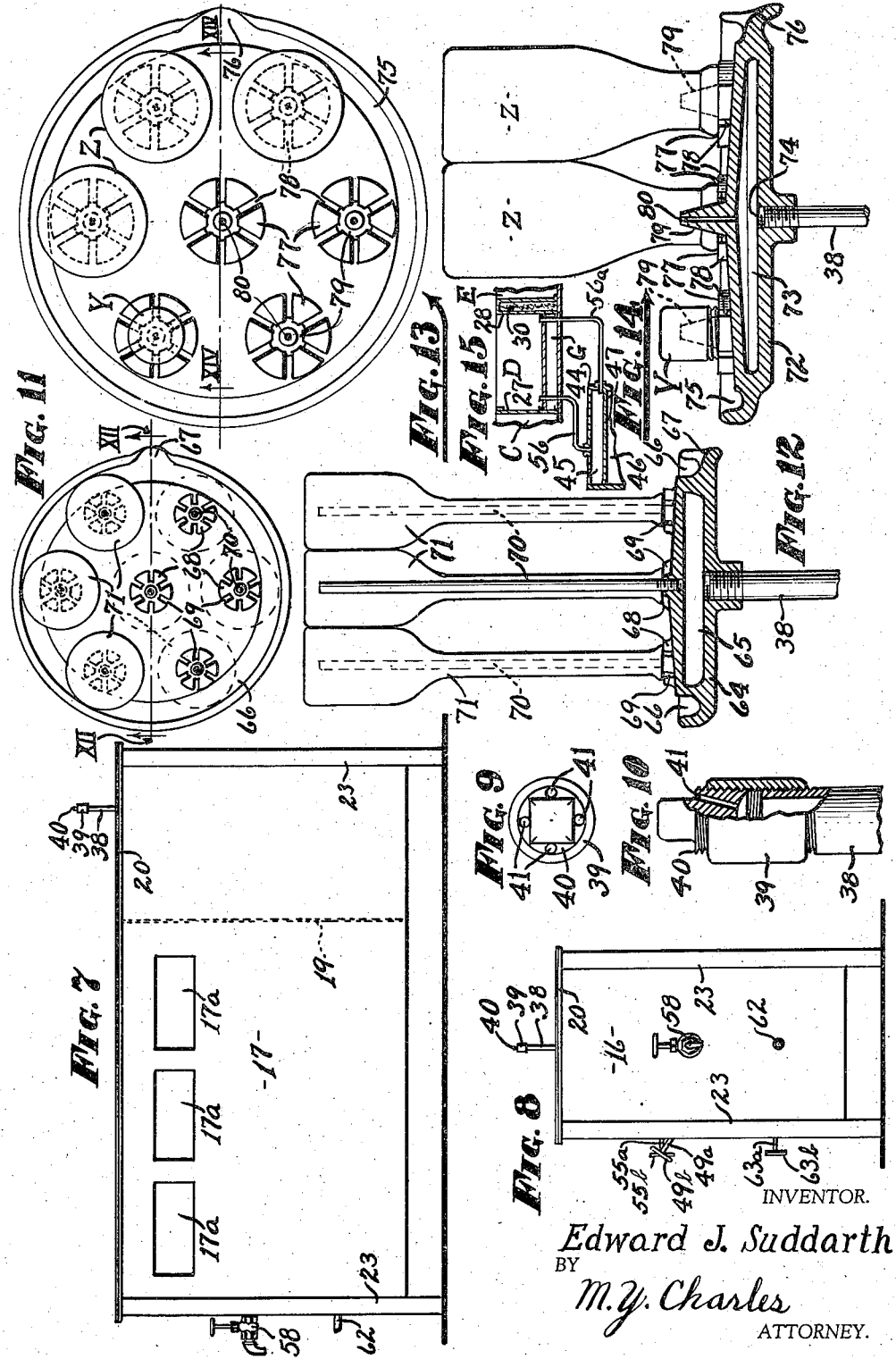

Patented Jan. 17, 1939

2,144,468

UNITED STATES PATENT OFFICE 2,144,468

CLEANSER AND STERILIZER FOR MILK AND CREAM CONTAINERS

Edward J. Suddarth, Wichita, Kans.

Application December 20, 1935, Serial No. 55,434

4 Claims. (Cl. 141—7)

My invention relates to an improvement in cleansing and sterilizing equipment for cream and milk containers and the like. This equipment is practical for use in cream buying stations, dairies and the like.

The object of this invention is to provide a device in which milk or cream containers, such as cream cans and the like may be washed and sterilized.

A still further object is to provide a device of the kind mentioned in which provision is made for washing and sterilizing cream sample jars, test bottles and milk and cream bottles and the like. These and other objects will be more fully explained as this description progresses.

Referring to the accompanying drawings, Fig. 1 is a front view of the device. Fig. 2 is a longitudinal sectional detail view of the device. Fig. 3 is a plan view of the device. Fig. 4 is a sectional view taken on the line IV—IV in Figs. 1 and 2. Fig. 5 is a sectional view taken on the line V—V in Fig. 2. Fig. 6 is a sectional view taken on the line VI—VI in Fig. 2. Fig. 7 is a rear view of the device. Fig. 8 is a view of the right hand end of the device as shown in Fig. 1. Fig. 9 is a detail plan view of the steam jet. Fig. 10 is a side view of the steam jet device, part of which is shown in section for convenience of illustration. Fig. 11 is a plan view of the sterilizing steam head employed in sterilizing cream test bottles. Fig. 12 is a detail sectional view of the device shown in Fig. 11, the view being taken on the line XII—XII in Fig. 11. Fig. 13 is a plan view of the steam head employed in sterilizing cream sample bottles and milk bottles. Fig. 14 is a detail sectional view of the device shown in Fig. 13, the view being taken on the line XIV—XIV in Fig. 13. Fig. 15 is a sectional view, the same as in Fig. 2 and showing a modification of the heating scheme for the water in the compartment D. In the drawings, similar numerals of reference designate the same part throughout the several figures of the drawings.

In the drawings is shown a housing having a front wall 15, an end wall 16, a rear wall 17 and an opposite end wall 18. At 19 is a dividing wall in the housing dividing the housing into two compartments A and B, the front side of the compartment A being left open as shown in Figures 1 and 4. The front wall 15 is provided with a pair of doors 15a and 15b that are hinged to the wall 15 and open into the compartment B for purposes that will be later explained. In the rear wall 17 are openings 17a that open into the compartment B and provide a means of allowing a draft of air to flow upwardly from the bottom of the compartment B and discharge through the openings 17a. The walls 15 to 18 inclusive are supported on angle iron frames 20 and 21 that are carried on angle iron leg elements 22 that are covered with sheet metal housing elements 23.

In the frame element 20, and supported thereby, is a curved bottom element 24 having end walls 25 and 26, said elements 24, 25 and 26 forming a curved bottom, open top container. In the container is a series of transverse partitions 27, 28 and 29 which form a series of open top compartments C, D, E and F. The partition 28 is a double partition having a heat insulating material such as asbestos 30 between the two metal walls of the partition 28. Fitted between the walls 27 and 28 is a curved element 24a, the opposite side edges of which join with the curved element 24 to form a closed chamber G. In the element 24a is a limited number of small holes 24b that function as an air escape for the chamber G. The lower portion of the partition 29 is curved to meet the end wall 26 for reasons that will be later explained.

Between the end wall 25 and the walls of the housing is a funnel shaped element 31 having a discharge opening 32 that drains into the compartment A. Across the upper portion of the funnel element 31 is a pair of tubular elements or pipes 33 and 34, which lie in the same horizontal plane. At 35 is a T-fitting in the pipe 34 and in which is a nipple 36 on which is threaded an L-fitting 37 which supports a vertically positioned pipe 38 on which is screwed a coupling 39. At 40 is a steam jet in the coupling 39 which is provided with a plurality of angularly directed steam discharge passages 41.

In the compartment B is a pair of angle iron support elements 42 and 43, the ends of which are attached to, and are supported by, the end wall 16 and the partition wall 19. The angle irons 42 and 43 are spaced apart and in the angles thereof is seated a combination boiler and steam generator 44 which comprises two chambers 45 and 46, the chamber 45 being disposed above the chamber 46, the two chambers being separated only by the division wall 47.

At 48 is a pipe line connecting between the water chamber F and the steam generator chamber 46. In the pipe 48 is a control valve 49 and a check valve 50 which checks against a flow going to the chamber F. The control valve 49 is provided with a long stem 49a that extends through the front wall 15 of the housing, and is provided with a suitable handle 49b by which the valve 49 may be operated.

At 51 is a steam pipe line connecting to the steam generator chamber 46; the steam pipe line 51 and the water pipe line 48 being connected at the opposite ends of the steam generator chamber 46. At 52 is a T-fitting in the steam pipe line 51 and from the fitting 52 runs a steam pipe line 53 which connects with the pipe 34 to supply steam to the steam jet 40.

At 54 is a steam pipe line connecting with the T fitting 52 and the steam chamber G. In the steam pipe line 54 is a control valve 55 having a long stem 55a that extends through the front wall 15 of the housing and is provided with a suitable handle 55b by which the valve 55 may be operated.

At 56 is a water pipe line connecting between the boiler chamber 45 and the tank D. As shown in Fig. 15 at 56a is a return water line connecting between the compartment D and the boiler compartment 45.

At 57 is a pipe line connecting with the chamber C and functioning as a drain for the chamber C. In the pipe line 57 is a valve 58 to open or close the drain from the chamber C.

At 59 is a gas burner positioned below the steam generating chamber 46. The burner is provided with a fuel feed extension 60 and an air mixer 61 that is supplied with gas through the feed pipe 62. In the pipe line 62 is a control valve 63 that is provided with a long stem 63a having a suitable handle 63b by which the control valve 63 may be operated.

While the device is shown and described as having a gas burner, it will be understood that any other suitable heating device may be substituted for the gas burner.

The steam jet device shown in Fig. 10 is employed in sterilizing cream cans although other designs of jets may be used for this or other purposes.

In Figures 11 and 12 is shown a steam sterilizing head such as would be employed in sterilizing cream test bottles. The head 64 may be screwed on the steam supply pipe 38. In the steam head 64 is a chamber 65 to which steam may be fed through the pipe 38. The upper face of the head 64 is crowned so as to provide a drainage from the center to the outside edge where a trough 66 is provided with a drainage spout 67. The crowned face of the steam head 64 is provided with a plurality of flat top bosses 68 each of which is provided with radially extending drainage grooves 69. Each boss 68 is provided with a vertically disposed hole on the center axis of the boss, and the hole opens into the steam chamber 65. In each hole is fixed a vertically positioned tubular element 70. The tubular element 70 is long enough that a cream test bottle 71 may be turned upside down and placed over the tubular element 70 so that the neck of the bottle 71 will rest on the boss 68 and support the bottle 71 so that the upper end of the tube 70 will not touch the bottom of the bottle 71 and drainage from the bottle will drain through the grooves 69 as will be later explained.

In Figures 13 and 14 is shown a steam sterilizing head such as would be employed in sterilizing cream sample bottles, cream or milk bottles. The device comprises a steam head 72 having a steam chamber 73 therein and a threaded opening 74 that opens into the chamber 73, and in the threaded opening 73 is screwed the steam supply pipe 38. The upper face of the steam sterilizing head 72 is crowned so as to provide drainage from the center thereof to the outer edge into a trough 75 which is provided with a drainage spout 76. The crowned surface of the steam sterilizing head 72 is provided with a plurality of flat top bosses 77 each of which is provided with radially extending drainage grooves 78. Each boss is provided with an upwardly projecting nipple-like element 79 through which is a vertically disposed hole 80 connecting with the steam chamber 73.

The cleanser and sterilizer for milk and cream containers is used as follows:

Water is placed in the containers C, D and F, and water will flow from the container D through the pipe line 56 and fill the boiler chamber 45. The doors 15a and 15b may be opened after which the gas control valve 63 may be opened and by reaching through the door opening, a lighted match may be held over the gas burner to light the gas being emitted from the burner. The size of the flame from the burner may be governed by the control valve 63. The fire of the burner 59 will heat the combination steam generator and boiler and the water in the boiler chamber 45 will rise through the pipe line 56 and heat the water in the tank D, or as shown in Fig. 15, the water may be heated in the boiler 45, rise through the pipe line 56 into the compartment D and return through the pipe line 56a to the boiler 45 to be recirculated as just described. A cream can is now placed in the compartment A as indicated by the dotted lines 81 and the device is now ready to use.

Now a customer brings his cream in his cream can to the cream station to sell the cream. The attendant at the cream station takes a sample of the cream and places it in a sample jar for test purposes, then the balance of the cream is emptied into the cream station can. Some of the cream will stick to the walls of the customer's can. This cream may be removed by placing the customer's can in an inverted position over the steam jet 40 as indicated by the dotted lines X so that the can is supported over the funnel shaped element 31 and on the cross bar elements 33 and 34.

Now the valve 49 is opened and water from the compartment F will flow through the pipe line 48 and valves 49 and 50 into the steam generator chamber 46 whereupon the water is immediately transformed into steam which is jetted through the steam jet 40 into the can X whereupon the heat from the steam in the can X will liquefy the cream on the walls of the can X and it will drain out of the can X into the funnel 30 and into the creamery's can in the compartment A. This having been done, the can X may be placed in the water in the container C and washed. The water in the container C has been warmed by heat that has been liberated in the compartment B from the burner 59 and the combination steam generator and boiler.

The can X having been washed in the chamber C may now be replaced over the steam jet 40 and steam reapplied to the can sufficient to sterilize the can after which the can may be removed from over the jet 40 and set aside to cool. During the cooling process the heat of the can is sufficient that any moisture therein will be evaporated and by the time the can is cool it will also be dry and ready for use again.

The foregoing described operation being finished, now the usual process of testing the cream is carried on, in which cream is taken from the sample jar and placed in the test bottle for the test and hot water may be taken from the tank D to be used in making the cream test as is readily understood by those skilled in the art of testing cream. On completion of the test, the sample jar and test bottle may be emptied and then cleansed and sterilized as follows:

The coupling 39 and jet 40 are removed from the steam pipe 38 and the steam head 64 is screwed on the pipe 38. The test bottles 71 are now placed over the steam tubes 70 and steam is produced as previously described and jetted into the test bottles 70 through the tubes 70, thereby sterilizing and cleansing the bottles 71. Condensed steam will drain from the bottles onto the sloping top of the steam head 64 and drain into the trough 66 and out through the spout 67 into any suitable container that may be set thereunder. The test bottles thus cleaned and sterilized may now be removed from the steam head 64 and set away to cool. During the cooling process the heat in the test bottles will evaporate any moisture that may be in the bottles and the bottles will be left dry and clean ready to be used again.

Cream sample bottles Y, cream and milk bottles Z or other similar containers may be cleaned and sterilized as above described by placing the steam head 72 on the steam supply pipe 38 and performing the same process as described for the cleaning of the test bottles.

When steam is generated in the generator chamber 46, the check valve 50 will prevent a flow back to the water chamber F and the steam will be forced to flow through the pipe 50 which supplies the pipe lines 53 and 54. Now if the water in the container D is not as hot as desired, the valve 55 may be opened and the steam from the pipe 54 will fill the chamber G and function to raise the temperature in the chamber D. Air that may be in the chamber G will be displaced by the incoming steam and the air will pass out through the holes 24b. The insulated wall 28 and the vacant air chamber E will function to eliminate or retard the transmission of heat from the chamber D to the water in the chamber F. When the water in the compartment C becomes too dirty for further use, the valve 58 may be opened and the water in the compartment C will drain out through the pipe line 57.

Such modifications may be employed as lie within the scope of the appended claims, without departing from the spirit and intention of the invention. Now having fully described my invention, what I claim as new and desire to secure by Letters Patent is:

1. In a cleaning and sterilizing apparatus for containers; a frame work, a drainage element and a plurality of open top containers supported in said frame work; a combination steam generator and water boiler; said combination steam generator and water boiler comprising a composite unit having a steam generating chamber and a water heating chamber therein, said water heating chamber being positioned above the steam generating chamber, pipe means for supplying water from one of said containers to said steam generating chamber and means in said pipe means for governing the flow of water to said steam generating chamber, means connecting with the steam generator chamber for jetting steam into a container supported over said drainage element; pipe means connecting between said water heating chamber and another one of said containers for transmitting heated water from said water heating chamber to said container; means for heating said combination steam generator and water boiler, and means for the additional heating of the hot water in said other one of said containers by entering steam from said steam generating chamber into a chamber having a wall in common with the last said container.

2. A cleaning and sterilizing apparatus for containers comprising a frame work; a drainage element and a plurality of open top containers, supported in said framework; a combination steam generator and water boiler; said combination steam generator and water boiler comprising a composite unit having a steam generating chamber and a water heating chamber therein, said water heating chamber being positioned above the steam generating chamber; pipe means for supplying water from one of said containers to said steam generating chamber and means in said pipe for governing the flow of water to said steam generating chamber; means connecting with the steam generator chamber for jetting steam into a container supported over said drainage element; pipe means connecting between said water heating chamber and another one of said containers for transmitting heated water from said water heating chamber to said container; means for heating said combination steam generating and water boiler; and means for additional heating of the water in said other container comprising a chamber in heat transferring relationship to said other container and means connecting the steam generator and said chamber for injecting steam into said chamber.

3. In a cleaning and sterilizing apparatus for containers; a frame work, a drainage element and a plurality of open top containers, supported in said frame work; a combination steam generator and water boiler; said combination steam generator and water boiler comprising a composite unit having a steam generating chamber and a water heating chamber therein, said water heating chamber being positioned above the steam generating chamber; pipe means for supplying water from one of said containers to said steam generating chamber and means in said pipe for governing the flow of water to said steam generating chamber; means connecting with the steam generator chamber for jetting steam into a container supported over said drainage element; pipe means connecting between said water heating chamber and another one of said containers for transmitting heated water from said water heating chamber to said container; means for heating said combination steam generator and water boiler; a housing around said frame work, and a partition in said housing to form a first compartment and a second compartment; said first compartment having an open side for receiving a portable container, and said drainage element being so positioned as to drain into said first compartment and discharge into said portable container; said second compartment housing the first said containers and the said combination steam generator and boiler, and the heating means therefor.

4. In a cleaning and sterilizing apparatus for containers; a frame work, a drainage element and a plurality of open top containers, supported in said frame work; a combination steam generator and water boiler; said combination steam generator and water boiler comprising a composite unit having a steam generating chamber and a water heating chamber therein, said water heating chamber being positioned above the steam generating chamber; pipe means for supplying water from one of said containers to said steam generating chamber and means in said pipe for governing the flow of water to said steam generating chamber; means connecting with the steam generator chamber for jetting steam into a container supported over said drainage element; pipe means conecting between said water heating chamber and another one of said containers for transmitting heated water from said water heating chamber to said container; means for heating said combination steam generator and water boiler; a housing around said frame work, and a partition in said housing to form a first compartment and a second compartment; said first compartment having an open side for receiving a portable container; and said drainage element being so positioned as to drain into said first compartment and discharge into said portable container; said second compartment housing the first said containers and the said combination steam generator and boiler, and the heating means therefor; a closable utility opening in one of the walls of said second compartment, and ventilation openings in another of the walls of said second compartment.

EDWARD J. SUDDARTH.